J. REUSCH.
WASHING DEVICE FOR CLEANING WOUNDS.
APPLICATION FILED AUG. 6, 1908.

910,859.

Patented Jan. 26, 1909.

Witnesses:
L. Waldman
L. Bettelheim

Inventor:
Joseph Reusch
by B. Klinger
atty

UNITED STATES PATENT OFFICE.

JOSEPH REUSCH, OF WIESBADEN, GERMANY.

WASHING DEVICE FOR CLEANING WOUNDS.

No. 910,859.  Specification of Letters Patent.  Patented Jan. 26, 1909.

Application filed August 6, 1908. Serial No. 447,243.

*To all whom it may concern:*

Be it known that I, JOSEPH REUSCH, a subject of the German Emperor, and residing at Wiesbaden, in the Kingdom of Prussia and Empire of Germany, have invented a certain new and useful Improvement in Washing Devices for Cleaning Wounds, of which the following is a specification.

The subject-matter of the present invention is a washing-device for cleaning wounds on parts of the body.

A new feature of the washing device is that it can be heated, whereby the advantage is obtained that the liquids used for washing may be brought to any desired temperature.

Figure 1:
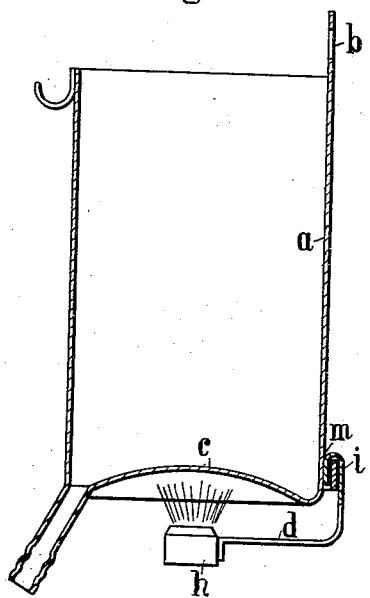
Figure 2:
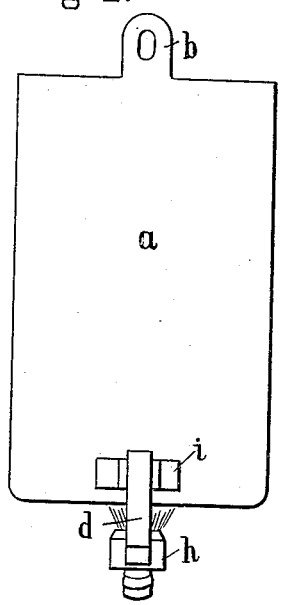

In the accompanying drawing: Figure 1 is an elevation, partly in section, and Fig. 2 is a side elevation of the device.

Referring to the drawing, $a$ is a receptacle for holding liquid for washing wounds. This receptacle is provided with an eye or loop $b$ for suspending it in known manner. The bottom $c$ of the receptacle is arched, and a heating device, for example a spirit lamp $h$, is arranged beneath it. The latter is detachably connected with the receptacle by the arm $d$ in such manner that the spirit lamp with its arm $d$ may be removed from the receptacle if it is not necessary to heat the liquid. For securing the lamp in position a loop $i$ is attached to the receptacle, in which loop the bent end $m$ of the arm may be placed, as clearly shown in the drawing.

What I claim as my invention and desire to secure by Letters Patent is:—

1. In a washing device for cleaning wounds, the combination of a receptacle having an arched bottom, a loop attached to the side of the receptacle, and a lamp having an arm adapted to be held in said loop, substantially as shown.

2. In a washing device for cleaning wounds, the combination of a receptacle having an arched bottom, a heating device disposed beneath said bottom, and means for rigidly and removably securing said heating device directly on said vessel.

3. In a washing device for cleaning wounds, the combination of a receptacle having an arched bottom, a heating device disposed beneath said bottom, and means for rigidly and removably securing said heating device directly to and at the rear of said vessel.

In testimony whereof, I affix my signature in the presence of two witnesses.

JOSEPH REUSCH.

Witnesses:
 JULIUS PILMERTH,
 THOMAS PLISCHKE.